United States Patent [19]
Bohorquez et al.

[11] 3,852,563
[45] Dec. 3, 1974

[54] THERMAL PRINTING HEAD

[75] Inventors: Jaime H. Bohorquez, Escondido; Norman H. MacNeil, Poway, both of Calif.

[73] Assignee: Hewlett-Packard Company, Palo Alto, Calif.

[22] Filed: Feb. 1, 1974

[21] Appl. No.: 438,883

[52] U.S. Cl. .......... 219/216, 219/543, 317/235 Q, 346/76 R
[51] Int. Cl. .......... H05b 1/00
[58] Field of Search .......... 219/216, 543; 29/576 OC, 29/576 E, 580; 317/235 Q; 346/76 R

[56] References Cited

UNITED STATES PATENTS

| | | | |
|---|---|---|---|
| 3,598,956 | 8/1971 | Cady, Jr. | 219/216 |
| 3,609,294 | 9/1971 | Cady, Jr. | 219/543 X |
| 3,700,852 | 10/1972 | Ruggiero | 219/543 X |

*Primary Examiner*—C. L. Albritton
*Attorney, Agent, or Firm*—Ronald E. Grubman

[57] ABSTRACT

A high density thermal printing head includes resistive heating elements on a layer of silicon which is epitaxially grown on a sapphire substrate. Isolation diodes are diffused into the silicon layers and in accordance with various embodiments of the invention, transistor decoding circuitry, logic control and other circuitry may also be diffused therein.

To facilitate the arrangement of the heater elements in an array without the necessity of numerous layers of metallic interconnections, portions of a layer in the silicon are doped with impurities to serve as highly conductive interconnections between various elements on the head. These interconnections are crossed beneath other metallic interconnections on the surface of the silicon to provide the electrical crossings necessitated by the physical arrangement of elements on the head. In some embodiments, the diodes and/or transistors are diffused into mesa-like regions of the silicon in direct communication with heater elements overlayed on the mesas.

5 Claims, 10 Drawing Figures

THERMAL PRINTING HEAD

BACKGROUND OF THE INVENTION

Thermal printing heads are currently known in which resistive heating elements and silicon semiconductor elements are bonded onto an alumina substrate. This type of device requires large numbers of external bonds to the printing head as well as large numbers of internal wire bonding among the various semiconductor and resistive printing elements. Consequently, the assembly yield for the production of such printing heads tends to be very low. Even more importantly, these prior art printing heads cannot be used for high density printing, since an even greater number of external bonds would have to be made to the head, an almost insurmountable task if the desired packing density of the heater elements is sufficiently high.

A different kind of thermal printing head known in the prior art is disclosed in U.S. Pat. No. 3,515,850, Thermal Printing Head with Diffused Printing Elements, issued to Richard C. Cady, Jr. on June 2, 1970. This thermal printing head utilizes a single crystal sapphire substrate upon which a layer of silicon is epitaxially deposited. An array of resistive heating elements and isolation diodes are diffused into the semiconductor layer. The device requires the use of numerous layers of metallic conductors interposed between various semiconductor layers in order to make electrical interconnections among the elements. This structure appears to be very complicated and might lead to thermal stresses from one layer to another, thereby reducing the reliability of the device. Furthermore, the printing head disclosed in the above-mentioned U.S. patent does not include any transistor decoding elements, so that decoding of the information to be printed must be done outside the printing head, which means in effect that a large number of external connections to the printing head must be made, the disadvantages of which are described above.

It would, therefore, be desirable to have a high density thermal printing head which requires only a relatively few external bonding connections to the head. The desired printing head would also include only a single layer in which metallic conductors were disposed between elements on the head itself. Preferably, transistor decoding logic would itself be an integral part of the printing head.

SUMMARY OF THE INVENTION

According to the illustrated preferred embodiments, the present invention provides a high density closely packed thermal printing head in which a number of resistive heating elements used for printing are integrated with diode isolation circuitry and/or transistor decoding logic circuitry on the printing head itself. According to the invention, a layer of silicon is epitaxially grown on a sapphire substrate. The silicon is appropriately etched and doped to produce diode isolation circuitry and/or transistor decoding circuitry. Also included on the sapphire substrate are a number of resistive elements which serve as printing elements when heated. Electrically the heating elements are arranged as a matrix so that any particular heater may be activated by electrically activating one row and one column of the matrix. Physically, however, the heating elements are positioned in a linear array to function as a print head. This matrix arrangement greatly reduces the number of electrical connections which need be made to the print head. However, in making electrical interconnections between the various elements on the print head, some connections will inevitably have to cross under or over other connections. According to the present invention, the required crossings are achieved without the use of multiple layers of conducting elements. Instead, a thin portion of the silicon layer adjacent to the sapphire substrate is doped with impurity atoms to form highly conductive regions which may conduct current between the diodes, transistors, and heaters on the printing head. Wherever required, this conductive layer serves to cross some electrical connections beneath other metallic connections which are formed on the top surface of the silicon layer.

In accordance with various embodiments of the invention, the diodes and/or transistors on the printing head are diffused into raised areas, or mesas of the silicon. The heater elements are then directly overlayed on these raised portions, so that the heater elements and associated circuitry are in direct communication, thereby further reducing the number of interconnections required.

DESCRIPTION OF THE INVENTION

Figure 1:
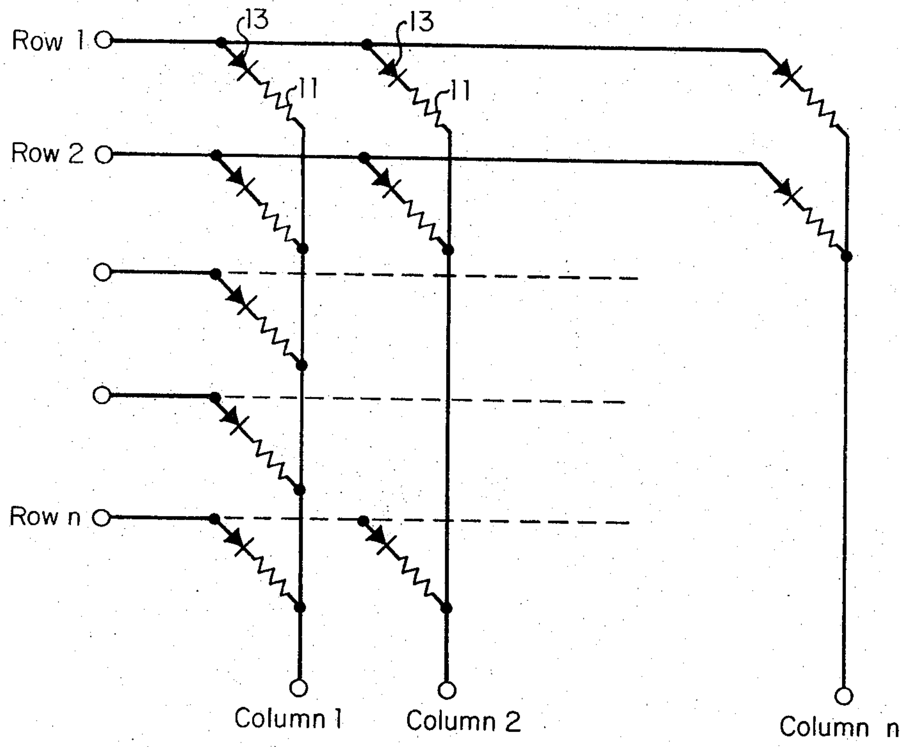
FIG. 1 illustrates an array of heating elements and isolation diodes used in a thermal printing head.

In FIG. 1 there is schematically illustrated a matrix array of isolation diodes and heating elements used for printing. By addressing a particular row and column of the array any one of the heating elements may be individually activated. A typical printing, or heating element is labelled 11 while its associated isolation diode is labelled 13.

Figure 2:
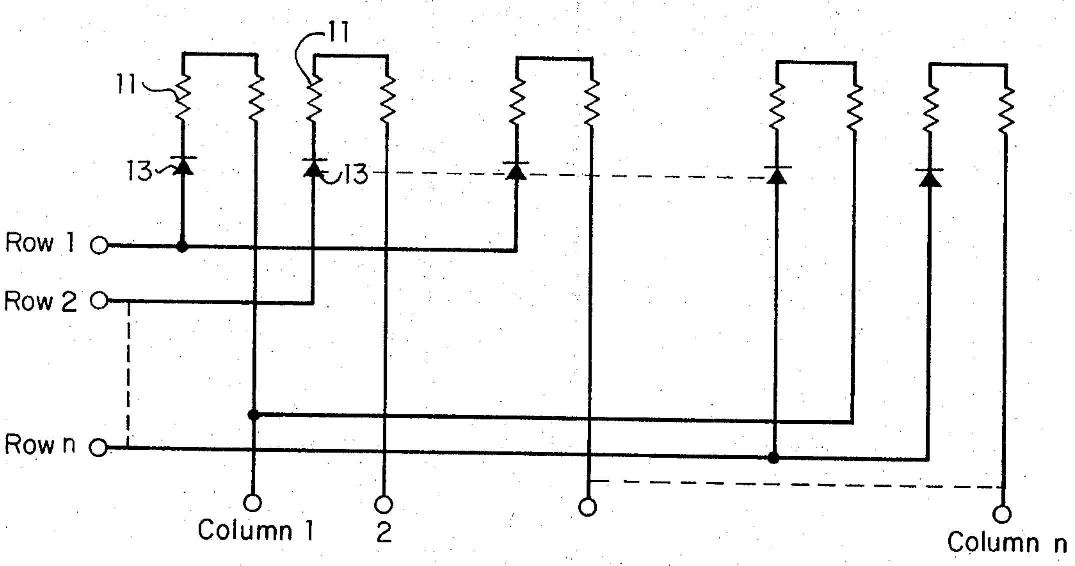
FIG. 2 illustrates an array of heating elements and isolation diodes in which the heating elements are linearly arranged for printing a line.

To function as a linear printing head, the heating elements must be physically oriented in a linear array. Such an array is schematically indicated by FIG. 2 in which printing element 11 and isolation diode 13 are identified by the same numbers as in FIG. 1. In a high density preferred embodiment of the invention the printing elements are spaced to achieve about 140–150 elements per inch. With this close packing of the printing elements, the contents of a 1024 memory may be printed on a standard 8 ½ by 11 sheet of paper.

In order to produce printing heads of the above-mentioned packing density with a reasonable assembly yield, it is preferable to produce several smaller printing elements each containing a fewer number of printing elements. The smaller units are then combined to make the final printing head. However, a difficulty in using a number of smaller elements fastened together is that uneven spacing between the resistor elements is likely to result from poor edge-to-edge abutment between the smaller elements. To alleviate this problem, the present invention uses a substrate of single crystal sapphire. As is known in the art, sapphire may be highly polished so that by polishing adjacent edges of individual pieces, good continuity and even spacing between resistor elements may be achieved when smaller units are fastened together to form a larger printing head. Various embodiments of a thermal printing head using a sapphire substrate are described below.

Figure 3:
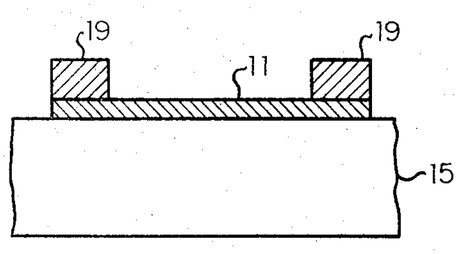
FIG. 3 shows a heater element on a sapphire substrate.

In FIG. 3, there is illustrated a preferred embodiment of the invention including a sapphire substrate 15 which is about 400 $\mu$ thick. Generally, thicknesses of sapphire substrate 15 in the range 150 $\mu$ to 1000 $\mu$ are suitable. Also illustrated in FIG. 3 is a thin film resistive element 11 on the sapphire substrate. Illustrated in cross-section are several metallic contacts 19 which supply current to resistive element 11. Preferably, resistive element 11 is of $Ta_2N$ or TaAl.

Figure 4:
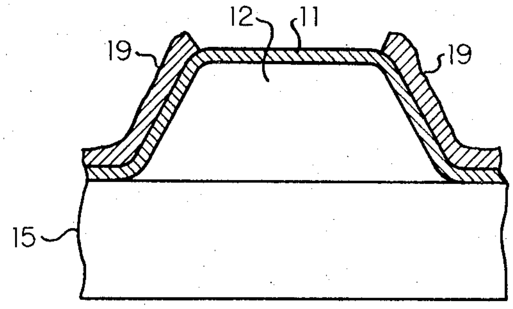
FIG. 4 illustrates a heater element on a thermally insulating mesa.

In FIG. 4, $Ta_2N$ or TaA1 heater elements 11 are positioned on the top of a raised mesa 12 of a thermally insulating substance. Materials such as glass and pyrite are typical of those which may be used. The use of a raised mesa puts printer elements 11 in better contact with paper upon which printing is to be done. Metallic contacts 19 are again used to conduct current to and from the heater.

Figure 5:
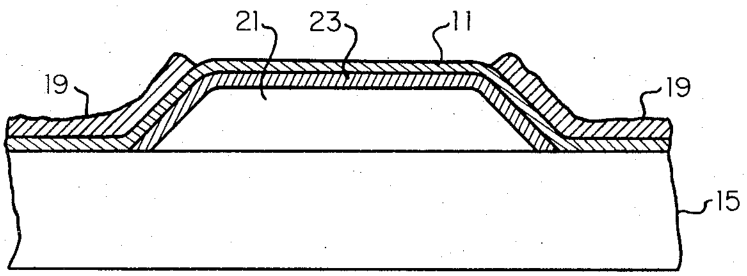
FIG. 5 shows a heater element on a silicon mesa epitaxially grown on a sapphire substrate.

In FIG. 5 there is illustrated a sapphire substrate 15 on which a layer of silicon has been epitaxially grown. In the preferred embodiment of FIG. 5, the epitaxially grown silicon takes the form of a raised island 21, thickness about 2 $\mu$ to 10 $\mu$. The raised island may be produced e.g. by first epitaxially growing a uniform layer of silicon over the entire sapphire substrate, and then performing an anisotropic etch (i.e. an orientation dependent etch) with a chemical such as alcohol hydrazine. As is known in the art, anisotropic etching along the 100 orientation of the crystal plane will etch faster in one clevage plane than in another. Thus, the silicon will take the form of a series of islands, of which island 21 is a typical example. In this embodiment of the invention, resistive printing elements 11 are deposited onto the top surface of silicon layer 21. Better contact of the printing elements with sheets of paper to be printed is thereby obtained. Also illustrated are a pair of metallic contacts 19 to deliver current to and from printing elements 11. An insulating layer 23 which may be e.g. $SiO_2$ is shown as being interposed between printing element 11 and silicon layer 21. It may be noted that in an embodiment using a raised silicon mesa, thermal printing might be performed by directly heating up the silicon mesa contacting an exposed area of the silicon to heat sensitive paper on which it is desired to print. However, in accordance with this embodiment of the invention, the use of $Ta_2N$ or TaA1 heaters rather than the direct use of the top portion of silicon layer 21 as a printing head produces a printer with a more rapid writing speed, there being no need to heat up and cool down the bulk silicon. 1

Figure 6:
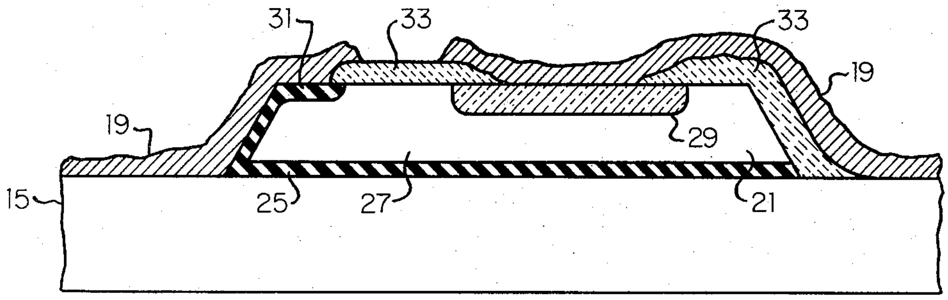
FIG. 6 illustrates a diode structure doped into a silicon mesa on a sapphire substrate.

In FIG. 6 there is shown a single crystal sapphire substrate 15. A silicon mesa 21 is epitaxially grown on the sapphire substrate as described above in connection with FIG. 5. By suitable doping of silicon mesa 21, a lateral diode may be fabricated for use as an isolation diode in the print head matrix (e.g. diodes 13 in FIGS. 1 and 2). In accordance with a preferred embodiment of the invention, an isolation diode may be fabricated by doping silicon layer 21 with phosphorus to an impurity concentration of about $10^{20}$ impurity atoms/cc. in a region about 1 $\mu$ thick directly adjacent to sapphire substrate 15. This region constitutes an $N^+$ highly conductive region labelled 25. Immediately above $N^+$ region 25 is a region of about 4 $\mu$ thick constituting an N layer 27 with an impurity concentration of about $5 \times 10^{15}$ atoms/cc. Arsenic doping is suitable for fabrication of this layer. The anode end of the isolation diode is formed from a $P^+$ region 29 which has an impurity concentration of about $7 \times 10^{12}$. Boron doping may be used effectively to create $P^+$ region 29. A cathode region 31 is fabricated by doping the silicon with a material such as phosphorus to produce an $N^+$ region 31 of impurity concentration about $10^{15}$ atoms/cc. This $N^+$ region 31 is in contact with an aluminum contact 19. Another aluminum contact also labelled 19 is in contact with $P^+$ anode 29. In the preferred embodiment an insulating region 33 is formed on silicon layer 21. This layer may be, for example, of $SiO_2$ and serves to insulate the pair of metal contacts 19 from silicon mesa 21 in those areas where contact is not desired.

Figure 7A:
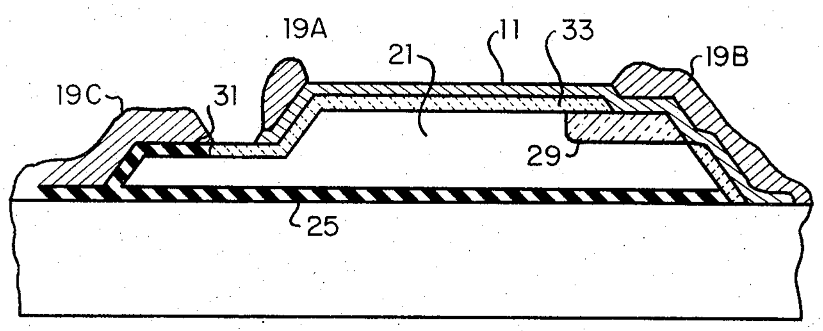
FIGS. 7A and 7B show two views of an integrated heater-isolation diode structure.
Figure 7B:
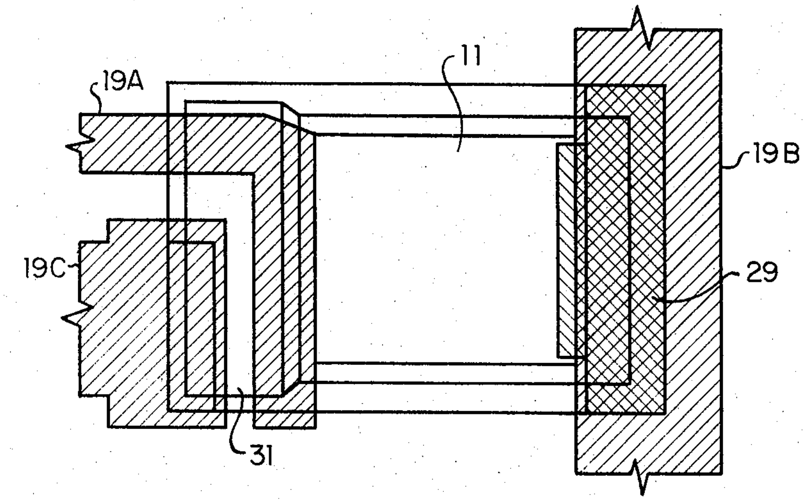

In FIGS. 7A and 7B there are shown an isolation diode and a heater element integrated on one silicon mesa. Corresponding numbers indicate corresponding elements in both figures. In FIG. 7A, a diode similar to that described in connection with FIG. 6 is diffused into a silicon mesa 21. It may be seen that a $P^+$ region 29 serving as an anode has been diffused into the right-most side of the mesa in this embodiment. An insulating region 33 similar to that in FIG. 6 is included, but has been extended from the right-most portion to the extreme left-most portion of the mesa. A $Ta_2N$ or a TaA1 heater element 11 is formed on insulating region 33. As described in connection with FIG. 6, an $N^+$ region 25 functions to conduct current to an $N^+$ cathode region 31. In FIG. 7B, the electrical paths associated with the integrated heater isolation diode arrangement are illustrated in more detail. Metallized contacts are illustrated with wide cross-hatching, while anode region 29 and cathode region 31 are illustrated with narrow cross-hatching. In operation, current flows into heater element 11 through a metallized contact 19A and exits through a metallized contact 19B which is in physical proximity to anode 29. Current then flows through anode 29 and silicon 21 to the highly conductive return path 25 (see FIG. 7A) under the silicon layer and thence to cathode region 31 and out the metallic contact 19C.

Figure 8A:
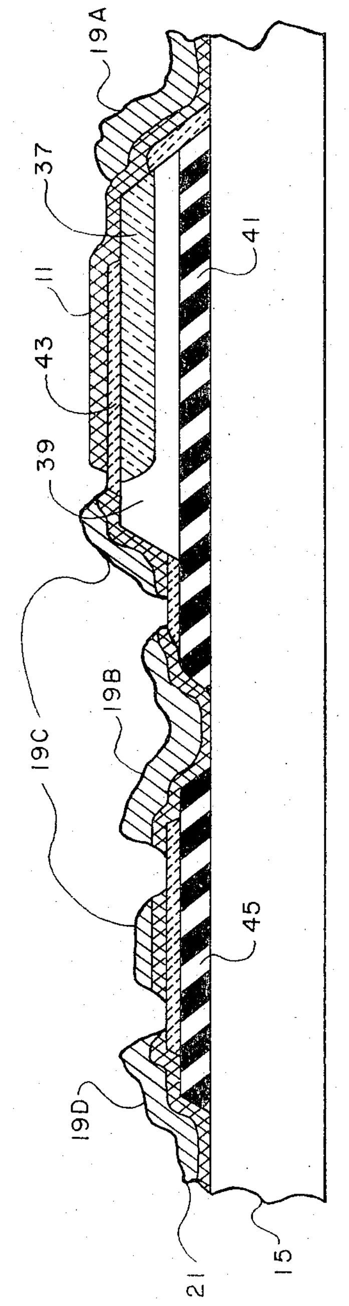
FIGS. 8A and 8B are two views of an integrated heater-transistor structure including an electrical cross-under using a doped highly conductive layer in a silicon mesa.
Figure 8B:
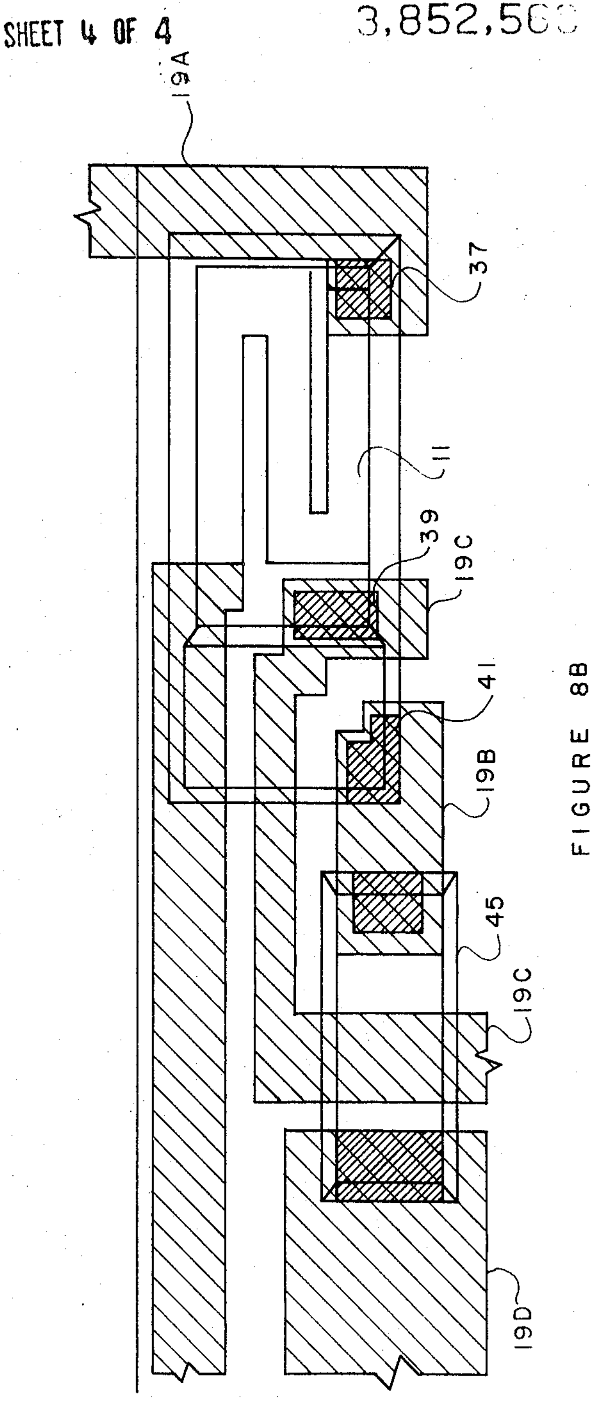

In accordance with another embodiment of the invention, transistor decoding logic circuitry is itself included on the printing head. FIGS. 8A and 8B illustrate a configuration in which a transistor is doped into silicon layer 21 on sapphire substrate 15. The transistor includes a collector region 37 which is an $N^+$ region of impurity concentration about $10^{17}$ atoms/cc., which may be achieved by phosphorus doping. A base region 39 is a P region doped to an impurity concentration of about $10^{14}$ atoms/cc., which may be suitably done by boron doping. Another $N^+$ region of impurity concentration of about $10^{20}$ atoms/cc. functions as an emitter 41. A $SiO_2$ insulating layer 43 is on collector region 37 and serves to isolate the collector region from a $Ta_2N$ or TaAl heater element 11 positioned above insulating layer 43. In FIG. 8B the emitter, collector and base regions as well as the heater are indicated by corresponding numerals. The broadly cross-sectioned areas 19A–19D are indicative of metallic conducting lines on the surface of silicon layer 21. These conductors serve as contacts to the emitter 41, base 39, collector 37, and heater 11. In FIG. 8A there is shown also a region 45 which is an $N^+$ region of impurity concentration about $10^{20}$ atoms/cc. As may be seen in FIGS. 8A and 8B this highly conductive region 45 serves to electrically connect the emitter contact 19B with another metallic contact 19D by crossing under a metallic base contact 19C. The use of highly doped $N^+$ region 45 as a cross-under electrical connection is important in the construction of matrix-like printing heads, since it is very often necessary to have various electrical lines cross one another spatially. By utilizing a conductive layer 45 at the base of silicon layer 21 to cross under certain metallic contacts there is eliminated the necessity for multilayer metallic interconnections throughout the printing head. This cross-under technique may also be employed in any of the other embodiments of the invention illustrated in the preceding figures. The integrated logic and decode structure as illustrated in FIGS. 8A and 8B allows maximum utilization of area to increase packing density of the elements on the substrate. By using transistors, diodes and heating elements in various combinations, a variety of logic control and drive functions can be accomplished directly on the printing head. All of these functions may be achieved without the problem of external wiring to the various elements.

We claim:

1. A thermal printing device comprising:

a sapphire substrate;

a body of semiconductor material epitaxially grown on the substrate;

a plurality of thin film heating elements on the body of semiconductor material;

a plurality of semiconductor devices diffused into the body of the semiconductor material;

a plurality of metallic interconnections among the heating elements and the semiconductor devices; and a plurality of highly conductive regions diffused in a single layer of the body of semiconductor material, said regions being interconnected among the heating elements and the semiconductor devices to serve as electrical connections therebetween.

2. A thermal printing device as in claim 1 wherein the plurality of thin film heating elements are of materials selected from the group consisting of $Ta_2N$ and TaAl.

3. A thermal printing head as in claim 1 wherein said plurality of semiconductor devices comprises a plurality of isolation diodes, each diode being associated with one element of said plurality of heating elements.

4. A thermal printing head as in claim 3 wherein each isolation diode is diffused into the body of semiconductor material in a region directly below the heating element associated with that diode, one of the anode and cathode of the isolation diode being in electrical contact with its associated heating element.

5. A thermal printing head as in claim 3 wherein said plurality of semiconductor devices further includes a plurality of transistors and other diodes diffused into the body of semiconductor material to serve as decoding, logic control and drive circuitry.

* * * * *